(12) United States Patent
Dai

(10) Patent No.: US 8,437,124 B2
(45) Date of Patent: May 7, 2013

(54) VIDEO DISPLAY AND CAR USING THE SAME

(75) Inventor: Lung Dai, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 72 days.

(21) Appl. No.: 13/091,896

(22) Filed: Apr. 21, 2011

(65) Prior Publication Data

US 2011/0310539 A1    Dec. 22, 2011

(30) Foreign Application Priority Data

Jun. 22, 2010 (CN) .......................... 2010 1 0205276

(51) Int. Cl.
*G06F 1/16* (2006.01)

(52) U.S. Cl.
USPC ............ 361/679.24; 361/679.21; 361/679.58; 248/917; 348/834; 348/835; 359/601; 359/609

(58) Field of Classification Search .............. 361/679.24
See application file for complete search history.

(56) References Cited

U.S. PATENT DOCUMENTS

| | | | |
|---|---|---|---|
| 5,128,829 A * | 7/1992 | Loew | 361/679.3 |
| 5,668,612 A * | 9/1997 | Hung | 348/818 |
| 5,803,424 A * | 9/1998 | Keehn et al. | 248/489 |
| 6,044,473 A * | 3/2000 | Kim | 713/320 |
| D463,779 S * | 10/2002 | Cobian et al. | D14/450 |
| 6,553,697 B1 * | 4/2003 | Pichan | 40/591 |
| D504,899 S * | 5/2005 | Ellis et al. | D14/450 |
| 6,967,635 B2 * | 11/2005 | Hung | 345/32 |
| 7,553,034 B1 * | 6/2009 | Liou et al. | 359/601 |
| D613,075 S * | 4/2010 | DeNicola | D6/300 |
| 8,075,145 B2 * | 12/2011 | Engblom et al. | 359/609 |
| 8,243,438 B2 * | 8/2012 | Wang et al. | 361/679.55 |
| 2006/0078321 A1 * | 4/2006 | Osawa et al. | 396/6 |
| 2007/0023264 A1 * | 2/2007 | Wang | 200/61.7 |
| 2008/0030631 A1 * | 2/2008 | Gallagher | 348/818 |
| 2009/0230716 A1 * | 9/2009 | Chae | 296/97.9 |

* cited by examiner

*Primary Examiner* — Anthony Q Edwards
(74) *Attorney, Agent, or Firm* — Altis Law Group, Inc.

(57) ABSTRACT

A video display includes a housing, a screen and a protective cover. The housing includes a first side and a second side opposite to the first side. The screen is disposed on the first side of the housing. The protective cover is rotatably connected to the housing and coverable on the screen. The protective cover is capable of being held in any position in the process of rotating from the first side to the second side, as the driving force is removed. A car using the video display is also provided.

14 Claims, 4 Drawing Sheets

VIDEO DISPLAY AND CAR USING THE SAME

BACKGROUND

1. Technical Field

The present disclosure relates to video displays; and particularly to a video display being used in a car.

2. Description of Related Art

Video displays such as for GPS navigation, etc., are becoming very popular for use in cars. However, ambient light may be reflected from the screen onto the driver's eyes, which may disturb the driver's line of sight and thus create a road hazard. Also dust particles may accumulate on the screen and obscure the contents being displayed on the screen.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
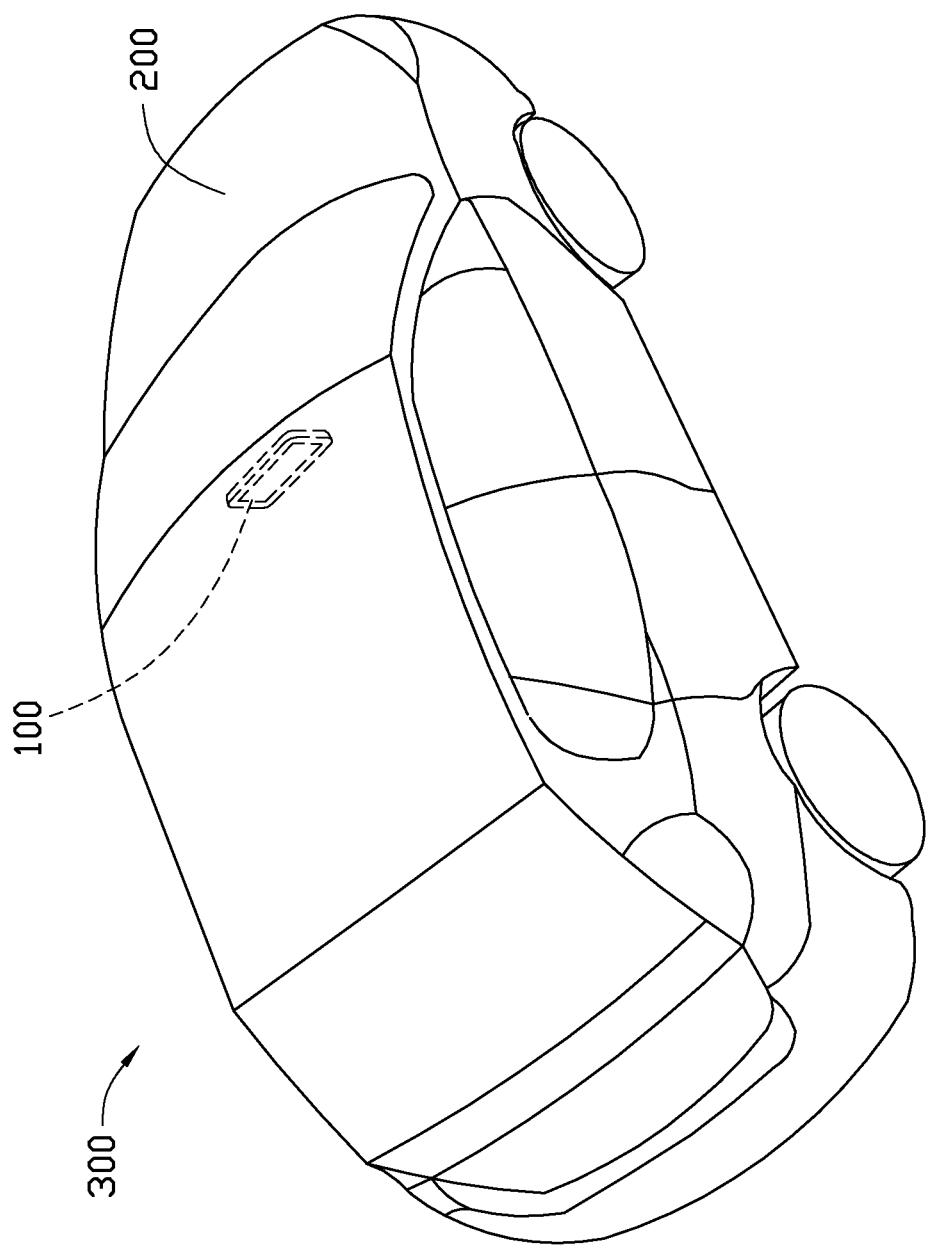
FIG. 1 is a schematic view of a video display in accordance with an embodiment, the video display is being used in a car.

Referring to FIG. 1, a car 300 with a video display 100 is shown. The car 300 includes a main body 200. The video display 100 is arranged in the main body 200.

Figure 2:
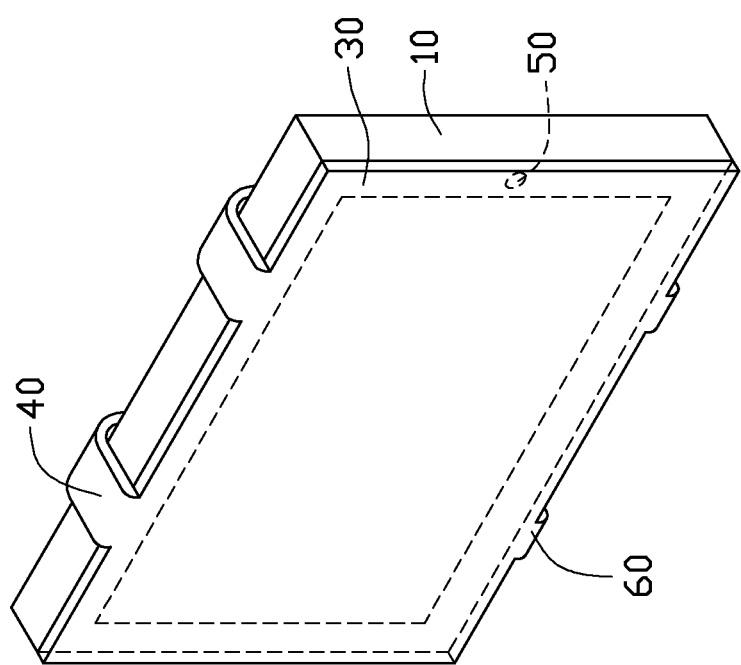
FIG. 2 is a perspective view showing the video display of FIG. 1 in a first state.
Figure 3:
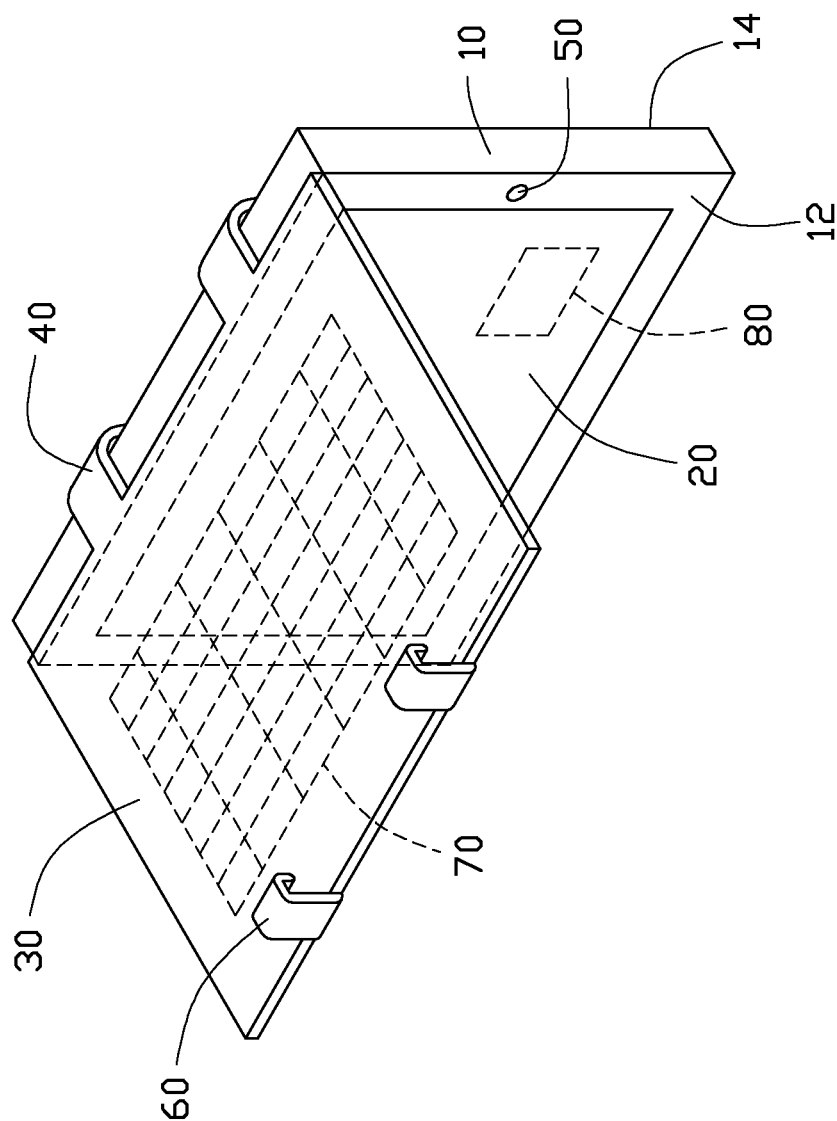
FIG. 3 is a perspective view showing the video display of FIG. 1 in a second state.

Referring further to FIGS. 2-3, the video display 100 is disposed in the main body 200 with a bracket (not shown). The video display 100 includes a housing 10, a screen 20 disposed in the housing 10, a protective cover 30 and two connecting arms 40. The housing 10 includes a first side 12 and a second side 14 opposite to the first side 12. The screen 20 is disposed on the first side 12. The connecting arms 40 connect the protective cover 30 to the housing 10. The protective cover 30 is capable of covering the screen 20 to protect the screen 20, and is capable of rotating from the first side 12 to the second side 14 of the housing 10. The video display 100 may further include a rechargeable battery 80. The rechargeable battery 80 is received in the housing 10, and is used to supply power for the video display 10. A switch 50 is arranged at the first side 12 of the housing 10. The switch 50 is actuated to turn the video display 100 on or off.

The two connecting arms 40 may be substantially strip-shaped. The connecting arms 40 are bendable and enable the protective cover 30 to rotate relative to the housing 10 when a driving force is applied to the protective cover 30. The protective cover 30 can be held in any position in the process of rotating from the first side 12 to the second side 14, by the connecting arms 40, as the driving force is removed. Opposite ends of the connecting arms 40 are respectively connected to the second side 14 of the housing 10 and a rim of the protective cover 30.

In some embodiments, the protective cover 30 may be substantially a rectangular plate. The size of the protective cover 30 may be substantially equal to that of a front face of the housing 10. When the protective cover 30 covers the front face, the protective cover 30 actuates the switch 50 to turn off the power of the video display 100. When the protective cover 30 rotates relative to the housing 10 and away from the front face, the switch 50 is released to turn on the power of the video display 100.

In other embodiments, a solar panel 70 may be disposed on the protective cover 30. The solar panel 70 is arranged on a surface of the protective cover 30 facing the screen 20. The solar panel 70 is electrically connected to the rechargeable battery 80. The solar panel 70 is capable of receiving sun light passing through the car's window and converting the solar energy into electrical energy. The electrical energy is capable of being stored in the battery 80 to power the video display 100.

Figure 4:
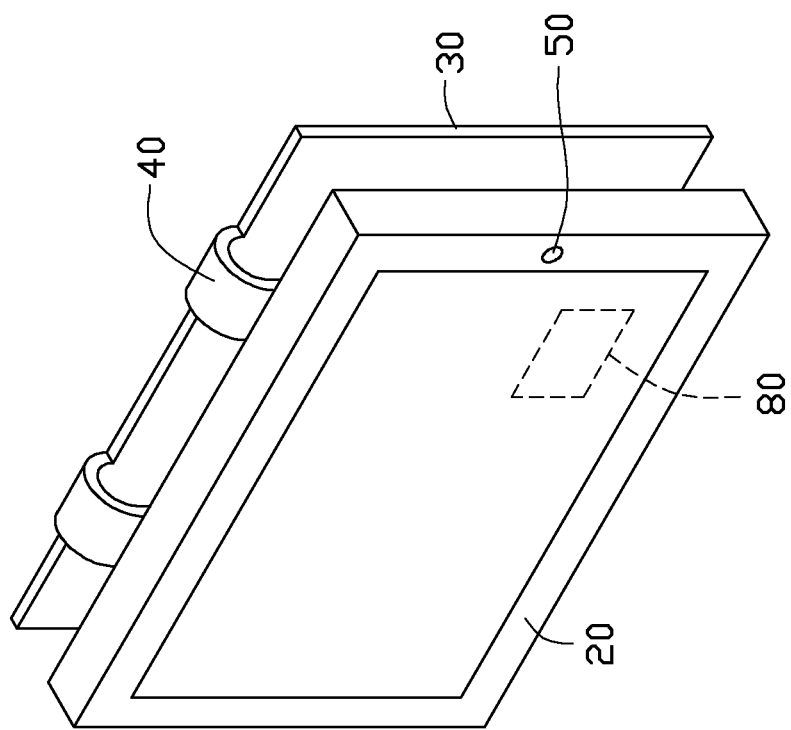
FIG. 4 is a perspective view showing the video display of FIG. 1 in a third state.

Referring to FIG. 3, two latching members 60 are secured to a rim of the protective cover 30 opposite to the connecting arms 40. The latching members 60 are flexible and moldable and can be flexed or molded to be held in any position. The latching members 60 are used to latch the protective cover 30 to the housing 10 when the protective cover 30 covers the screen 20. When the protective cover 30 is rotated to a positioning angle with the housing 10 to shield the screen 20 from sunlight, the latching members 60 is hooked to an inner wall of the car 300 to cooperate with the connecting arms 40 to steadily position the protective cover 30 in the positioning angle. Referring to FIG. 4, because the latching members 60 are flexible, when the protective cover 30 is rotated to the second side 14 of the housing 10, the latching members 30 supports a surface of the protective cover 30 opposite to the solar panel 70 to protect the protective cover 30 from colliding with the second side 14 of the housing 10.

Referring to FIG. 2, when the protective cover 30 covers the screen 20, the protective cover 30 protects the screen 20 from dust. Referring to FIG. 3, when the protective cover 30 is rotated to a positioning angle with the housing 10, such as, 90 degrees, the protective cover 30 shields the screen 20 from sunlight. Referring to FIG. 4, when the protective cover 30 is rotated to the second side 14 of the housing 10, the solar panel 80 is exposed to the sunlight.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A video display, comprising:
 a housing comprising a first side and a second side opposite to the first side;
 a screen disposed on the first side of the housing;
 a protective cover rotatably connected to the housing and operable to cover the screen; a bendable connecting arm, the connecting arm connecting the protective cover to the housing and at least one latching member secured at a distal end of the protective cover away from the bendable connecting arm;

wherein the protective cover is capable of rotating from the first side to the second side of the housing when a driving force is applied to the protective cover, and is capable of being held in any position in the process of rotating from the first side to the second side, as the driving force is removed; wherein the at least one latching member is flexible and moldable, when the protective cover covers the screen, the at least one latching member is used to latch the protective cover to the housing.

2. The video display of claim 1, wherein a switch is disposed on the first side of the housing, and the switch is capable of turning off the video display as actuated by the protective cover when the protective cover covers on the screen, and turning on the video display when the protective cover away from the screen.

3. The video display of claim 1, further comprising a rechargeable battery for powering the video display.

4. The video display of claim 3, wherein a solar panel is disposed on the protective cover and is electrically connected to the rechargeable battery, and the solar panel is used for receiving sunlight and converting solar energy to electric energy to charge the rechargeable battery.

5. A car, comprising:
a main body; and
a video display arranged on the main body;
wherein the video display comprises a housing fixed to the main body, a screen disposed on the housing, a protective cover rotatably connected to the housing and coverable on the screen, a bendable connecting arm connecting the protective cover to the housing and at least one latching member secured at a distal end of the protective cover away from the bendable connecting arm, the housing comprising a first side and a second side opposite to the first side, the screen is disposed on the first side, the protective cover is capable of rotating from the first side to the second side of the housing when a driving force is applied to the protective cover, and is capable of being held in any angle with the housing in the process of rotating from the first side to the second side, as the driving force is removed; the at least one latching member is flexible and moldable, when the protective cover is rotated to be held in any position, the at least one latching member is capable of being hooked to an object to steadily position the protective cover.

6. The car of claim 5, wherein a switch is disposed on the first side of the housing, and the switch is capable of turning off the video display as actuated by the protective cover when the protective cover covers on the screen, and turning on the video display when the protective departs from the screen.

7. The car of claim 5, further comprising a rechargeable battery for powering the video display.

8. The car of claim 7, wherein a solar panel is disposed on the protective cover and is electrically connected to the rechargeable battery, and the solar panel is used for receiving sunlight and converting solar energy to electric energy to charge the rechargeable battery.

9. A car, comprising:
a main body; and
a video display arranged on the main body;
wherein the video display comprises a housing fixed to the main body, a screen disposed on the housing, a protective cover rotatably connected to the housing and coverable on the screen, a bendable connecting arm connecting the protective cover to the housing and at least one latching member secured at a distal end of the protective cover away from the bendable connecting arm, the housing comprising a first side and a second side opposite to the first side, the screen is disposed on the first side, the protective cover is capable of rotating from the first side to the second side of the housing when a driving force is applied to the protective cover, and is capable of being held in any angle with the housing in the process of rotating from the first side to the second side, as the driving force is removed; the at least one latching member is flexible and moldable, when the protective cover is rotated to the second side of the housing, the at least one latching member supports the protective cover to protect the protective cover from colliding with the housing.

10. The car of claim 9, wherein a switch is disposed on the first side of the housing, and the switch is capable of turning off the video display as actuated by the protective cover when the protective cover covers on the screen, and turning on the video display when the protective departs from the screen.

11. The car of claim 9, wherein when the protective cover is rotated to be held in any position, the at least one latching member is capable of being hooked to an object to steadily position the protective cover.

12. The car of claim 9, wherein a solar panel is disposed on the protective cover, the solar panel is used for receiving sunlight and converting solar energy to electrical energy for powering the video display.

13. The car of claim 12, wherein when the protective cover is rotated to the second side of the housing, the latching members supports a surface of the protective cover opposite to the solar panel to protect the protective cover from colliding with the second side of the housing.

14. The car of claim 9, wherein when the protective cover covers on the screen, the at least one latching member is used to latch the protective cover to the housing.

* * * * *